(12) United States Patent
Chaudhary et al.

(10) Patent No.: US 11,101,120 B2
(45) Date of Patent: Aug. 24, 2021

(54) FAST PRESSURE SENSING SYSTEM

(71) Applicant: SRI International, Menlo Park, CA (US)

(72) Inventors: Ashish Chaudhary, Safety Harbor, FL (US); Robert Timothy Short, St. Petersburg, FL (US)

(73) Assignee: SRI International, Menlo Park, CA (US)

( * ) Notice: Subject to any disclaimer, the term of this patent is extended or adjusted under 35 U.S.C. 154(b) by 122 days.

(21) Appl. No.: 16/664,389

(22) Filed: Oct. 25, 2019

(65) Prior Publication Data

US 2020/0161109 A1 May 21, 2020

Related U.S. Application Data

(60) Provisional application No. 62/770,639, filed on Nov. 21, 2018.

(51) Int. Cl.
*G01L 21/30* (2006.01)
*H01J 41/02* (2006.01)
(Continued)

(52) U.S. Cl.
CPC ............ *H01J 41/02* (2013.01); *G01L 9/0072* (2013.01); *G01L 19/0007* (2013.01); *G01L 21/12* (2013.01); *G01L 21/30* (2013.01); *G01L 21/32* (2013.01); *G01L 21/34* (2013.01); *G01N 27/64* (2013.01); *H01J 41/04* (2013.01); *H01J 41/06* (2013.01)

(58) Field of Classification Search
CPC ......... G01L 21/34; G01L 21/32; G01L 21/30; G01L 21/12; G01L 9/0072; G01L 19/0007; H01J 41/06; H01J 41/04; H01J 41/02; G01N 27/64

USPC ................................................. 324/459, 460
See application file for complete search history.

(56) References Cited

U.S. PATENT DOCUMENTS

2010/0032559 A1* 2/2010 Lopez-Avila ......... H01J 49/162
250/282
2011/0234233 A1* 9/2011 Brucker .................. G01L 21/34
324/460

(Continued)

OTHER PUBLICATIONS

Wiza, J.L., "Microchannel Plate Detectors," Nuclear Instruments and Methods, vol. 162, Nos. 1-3, Jun. 1979, 15 pp.

*Primary Examiner* — Raul J Rios Russo
(74) *Attorney, Agent, or Firm* — Shumaker & Sieffert, P.A.

(57) ABSTRACT

The disclosure includes an ionization chamber, a first electron multiplier, and a second electron multiplier. The ionization chamber is configured to receive gas molecules from an environment at a pressure. The first electron multiplier is configured to receive a plurality of photons from a photon source, generate a first plurality of electrons from the plurality of photons, and discharge the first plurality of electrons into the ionization chamber to generate a plurality of gas ions from at least a portion of the gas molecules. The second electron multiplier is configured to receive the plurality of gas ions from the ionization chamber and generate a second plurality of electrons from the plurality of gas ions that is proportional to a quantity of the plurality of gas ions. A quantity of electrons of the second plurality of electrons is indicative of the pressure.

22 Claims, 5 Drawing Sheets

(51) Int. Cl.
*G01N 27/64* (2006.01)
*G01L 21/34* (2006.01)
*G01L 21/32* (2006.01)
*G01L 21/12* (2006.01)
*G01L 9/00* (2006.01)
*G01L 19/00* (2006.01)
*H01J 41/06* (2006.01)
*H01J 41/04* (2006.01)

(56) References Cited

U.S. PATENT DOCUMENTS

2014/0167612 A1* 6/2014 Perelman ................ H01J 61/06
315/111.21
2020/0161109 A1 5/2020 Chaudhary et al.

* cited by examiner

FAST PRESSURE SENSING SYSTEM

This application claims the benefit of U.S. Provisional Patent Application 62/770,639, entitled "MINIATURE FAST PRESSURE SENSOR FOR HV APPLICATIONS" and filed Nov. 21, 2018, the entire content of which is incorporated herein by reference.

GOVERNMENT RIGHTS

This invention was made with Government support by the Office of the Director of National Intelligence (ODNI), and Intelligence Advanced Research Projects Activity (IARPA), under Contract FA8650-17-C-9108 awarded by USAF/AFRL. The Government has certain rights in this invention.

TECHNICAL FIELD

The disclosure relates to pressure sensing systems.

BACKGROUND

Pressure sensors used for vacuum applications may measure a pressure by measuring changes in material properties of a filament that are influenced by a concentration of gas molecules. For example, Pirani gauges may detect a pressure of gases based on thermal conductivity of the gases. A heated filament may change temperature due to gas collisions with the heated filament that are proportional to the concentration of the gas molecules. The change in resistance caused by the change in temperature may represent the pressure. At low pressures, gas collisions may be relatively infrequent and temperature changes relatively transient, such that a pressure measurement may be subject to a high degree of noise and may have a relatively slow response time.

SUMMARY

In general, this disclosure describes fast pressure sensing systems capable of detecting pressure changes in a high vacuum with a short response time. Example pressure sensing systems are described that use electron multipliers to both create ionization events with gas molecules using photons and an electron multiplier and amplify the response of the ionization events to quickly detect a pressure of the environment. For example, a pressure sensing system includes a photon source that emits controlled pulses of photons at relatively high sampling rates. A first electron multiplier generates electrons from the photons and emits the electrons into an ionization chamber containing gas molecules at a pressure. The emitted electrons may intersect and ionize a portion of the gas molecules to create gas ions. The likelihood of a gas molecule becoming ionized by the emitted electrons is proportional to a concentration of gas molecules in the ionization chamber, such that a proportion of gas molecules that are ionized for a particular quantity of emitted electrons may indicate the concentration, and thus the pressure, of the gas molecules. A second electron multiplier detects the gas ions by generating electrons from the gas ions and emitting the electrons towards an electrode. Electrons impact the electrode and generate an electrical signal having a current and/or voltage that is indicative of the pressure of the gas molecules in the ionization chamber. The electrical signal may be further processed based on parameters of the pressure sensor, such as optical properties of the photon source and gain of the electron multipliers, to convert the electrical signal into a pressure measurement signal.

In this way, pressure sensing systems discussed herein may quickly detect a change in pressure in a wide variety of applications, including applications that utilize high vacuum. In some examples, pressure sensing systems described herein may use a fast-switching photon source, such as an LED, that emits pulses of photons at a high rate without the use of a gating device or other mechanism for restricting photons, such that changes in pressure may be detected quickly and with reduced noise compared to pressure sensing mechanisms that do not use a fast-switching photon source. In some examples, power sources of the electron multipliers may control a rate or magnitude of electron generation of the first and second electron multipliers to control sensitivity of the pressure sensing system across a wide variety of pressures within an improved sensing range, such that the strength of the electrical signal may be sufficiently low to avoid saturation and sufficiently high to reduce noise and/or reduce response time.

In one example, a system as described herein includes an ionization chamber, a first electron multiplier, and a second electron multiplier. The ionization chamber is configured to receive gas molecules from an environment at a pressure. The first electron multiplier is configured to receive a plurality of photons from a photon source, generate a first plurality of electrons from the plurality of photons, and discharge the first plurality of electrons into the ionization chamber to generate a plurality of gas ions from at least a portion of the gas molecules. The second electron multiplier is configured to receive the plurality of gas ions from the ionization chamber and generate a second plurality of electrons from the plurality of gas ions that is proportional to a quantity of the plurality of gas ions. A quantity of electrons of the second plurality of electrons is indicative of the pressure.

In another example, a method as described herein includes receiving, by an ionization chamber, gas molecules from an environment at a pressure. The method includes, by a first electron multiplier, generating a first plurality of electrons from a plurality of photons from a photon source and discharging the first plurality of electrons into the ionization chamber to generate a plurality of gas ions from at least a portion of the gas molecules. The method includes, by a second electron multiplier, generating a second plurality of electrons from the plurality of gas ions that is proportional to a quantity of the plurality of gas ions. A quantity of the second plurality of electrons is representative of the pressure.

The details of one or more examples are set forth in the accompanying drawings and the description below. Other features, objects, and advantages of the disclosure will be apparent from the description and drawings, and from the claims.

DETAILED DESCRIPTION

Figure 1:
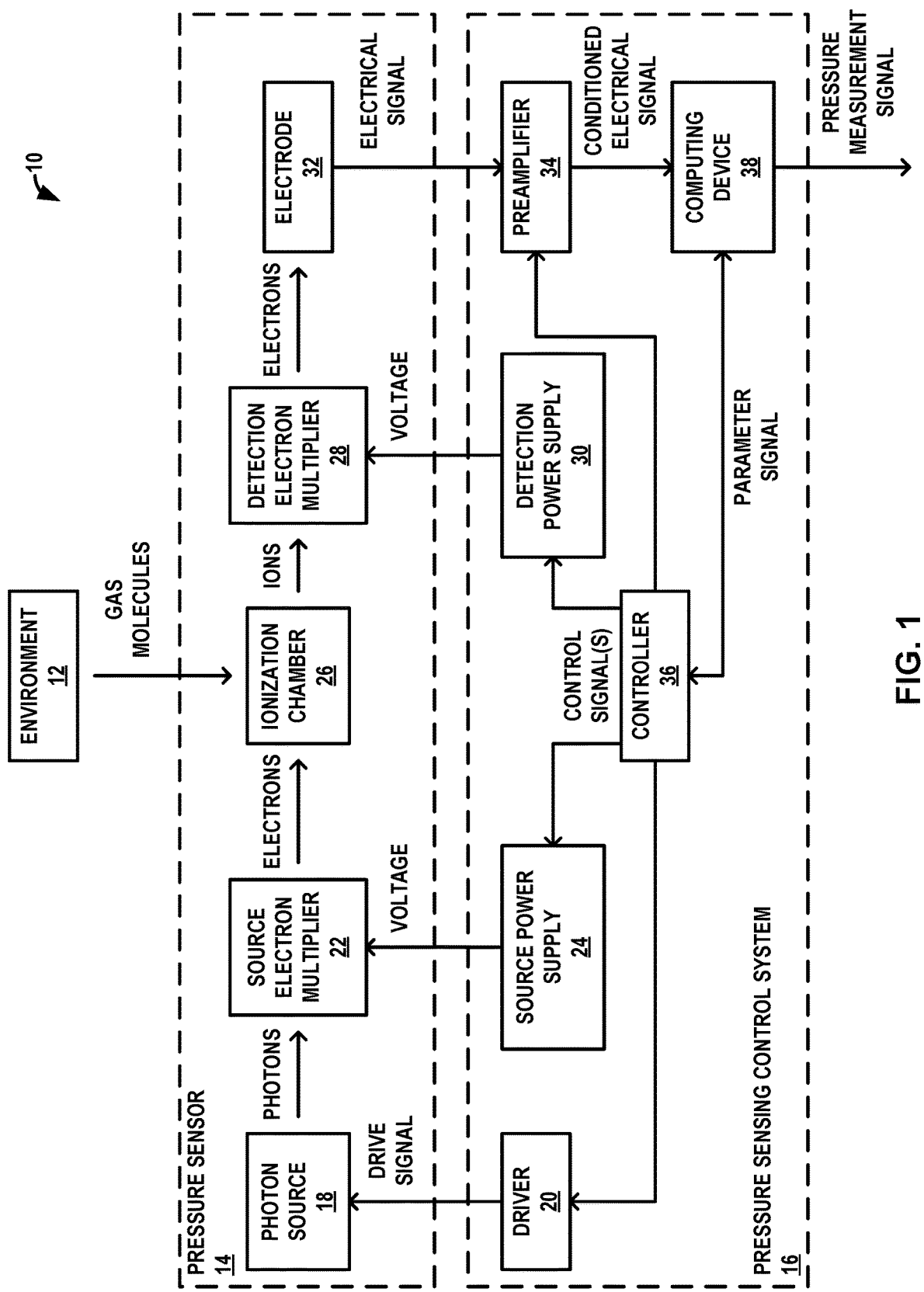
FIG. 1 is a conceptual and schematic block diagram illustrating an example pressure sensing system, in accordance with examples discussed herein.

Pressure sensing systems discussed herein may sense pressure and changes in pressure in various environments. FIG. 1 is a conceptual and schematic block diagram illustrating an example pressure sensing system 10, in accordance with examples discussed herein. Pressure sensing system 10 may be configured to receive gas molecules from an environment 12 and generate a pressure measurement signal indicative of a pressure of environment 12. Environment 12 may include any gaseous environment. For example, as will be explained further below, pressure sensing system 10 may be configured to generate the pressure measurement signal from ionization events that are proportional to a concentration of the gas molecules from environment 12, such that pressure sensing system 10 may be used with any environment 12 that includes gas molecules at a concentration. In some examples, environment 12 may be a high vacuum/low pressure environment, such as an environment at a pressure of less than about $10^{-4}$ torr. In some examples, the pressure of environment 12 may be between about $10^{-2}$ torr and about $10^{-9}$ torr.

Pressure sensing system 10 includes pressure sensor 14. Pressure sensor 14 is configured to receive gas molecules from environment 12 and generate an electrical signal indicative of the pressure of environment 12, such that pressure sensing control system 16 may further process the electrical signal based on parameters related to pressure sensing system 10 and/or the gas molecules of environment 12 to generate a pressure measurement signal representative of the pressure of environment 12. As illustrated in FIG. 1, pressure sensor 14 includes a source electron multiplier 22, an ionization chamber 26, and a detection electron multiplier 28, and may optionally include other components such as a photon source 18 and an electrode 32. As will be described in detail below, pressure sensor 14 may generate a first set of electrons from photons and ionize a portion of the gas molecules using the first set of electrons. The quantity of generated gas ions may be based on (e.g., proportional to) a concentration of gas molecules from environment 12 and may be used to generate a second set of electrons for quantification of the gas ions. Pressure sensor 14 may detect the electrons as an electrical signal having a current and/or voltage indicative of the pressure of environment 12. In this way, pressure sensor 14 may quickly sense the pressure of environment 12 compared to pressure sensing systems that do not use photons to generate electrons for ionization of gas molecules.

Pressure sensing control system 16 may be configured to control components of pressure sensor 14 to generate the electrical signal indicative of the pressure of environment 12 and to convert the electrical signal indicative of the pressure of environment 12 to a pressure measurement signal representative of the pressure of environment 12. As illustrated in FIG. 1, pressure sensing control system 16 may optionally include components such as a driver 20, a source power supply 24, a detection power supply 30, a preamplifier 34, a controller 36, and a computing device 38. As will be described in detail below, pressure sensing control system 16 may control parameters related to the emission of photons, the generation of electrons from photons and/or ions, and/or the conditioning of the electrical signal indicative of the pressure to produce an electrical signal that accurately indicates the pressure of environment 12 with a short response time and to generate and output the pressure measurement signal based on values of the parameters. In this way, pressure sensing control system 16 may control pressure sensor 14 to sense the pressure across a wide range of pressures compared to pressure sensing systems that do not control generation of electrons for ionization of gas molecules and detection of gas ions.

Pressure sensing system 10 may output the pressure measurement signal to a variety of systems for a variety of different applications. As one example, pressure sensing system 10 may be used to quickly detect changes in pressure and generate fast feedback in response to changes in pressure to protect pressure sensitive equipment. For example, pressure sensing system 10 may be coupled to an automated interlock system to reduce a loss of vacuum in response to a leak or other loss of vacuum event. As another example, pressure sensing system 10 may be used to detect pressures in high vacuum environments, such as cold atom sensors. For example, pressure sensing system 10 may be coupled to a cold atom sensor to measure of a pressure of the cold atom sensor at pressures less than $10^{-4}$ torr.

In some examples, pressure sensor 14 may include photon source 18. However, in other examples, pressure sensor 14 may not include photon source 18, such that pressure sensor 14 may be configured to receive photons from an external photon source 18. Photon source 18 may be configured (e.g., selected or operated) to emit a plurality of photons. In some examples, photon source 18 may emit the plurality of photons as pulses having a periodicity (or pulse rate) and pulse length. Photon source 18 may emit photons having a variety of properties including, but not limited to, wavelength of photons, quantity of photons (e.g., related to an intensity of photon source 18), period of pulses of photons, length of pulses of photons, and the like. Photon source 18 may be optically coupled to source electron multiplier 22 and configured to emit photons toward source electron multiplier 22 to intersect at least one surface of source electron multiplier 22.

Photon source 18 may be communicatively coupled to driver 20 and configured to receive electrical signals (i.e., "drive signals") from driver 20 and emit the plurality of photons in response the drive signals. In some examples, the drive signals may supply power to photon source 18, while in other examples, the drive signals may control power supplied to photon source 18 by another power source. For example, photon source 18 may be configured to emit a plurality of photons having the variety of properties based, at least in part, on properties (e.g., current, voltage, periodicity) of the drive signals from driver 20.

A variety of photon sources may be used for photon source 18 including, but not limited to, light emitting diodes (LED), lasers, and the like. In some examples, photon source 18 may be a fast-switching photon source. A fast-switching photon source may be configured to quickly (i.e., with a low switching time) emit a pulse of photons to accurately control a quantity of photons emitted toward source electron multiplier 22. In some examples, photon source 18 has a switching time (i.e., a time for an on/off cycle) of less than about 1 millisecond. In some examples, photon source 18 may include an ultraviolet (UV) light emitting diode (LED), such that the plurality of photons includes UV photons. For example, UV photons may have a high energy that may be more likely to generate electrons at source electron multiplier 22. In this way, photon source 18 may enable pressure sensor 14 to have a high sampling rate that allows quick detection of a change in pressure of environment 12.

Pressure sensing control system 16 may include driver 20. Driver 20 may be configured to control emission properties of the plurality of photons from photon source 18. Driver 20 may be electrically coupled to photon source 18 and configured to send drive signals to photon source 18 to drive operation of photon source 18. While driver 20 is illustrated as a separate component, in some examples, photon source 18 and driver 20 may be a same component. Driver 20 may be communicatively coupled to controller 36 and configured to receive control signals from controller 36 and generate drive signals for photon source 18 based on the control signals from controller 36. For example, driver 20 may include drive circuitry configured to receive control signals related to properties of photons emitted from photon source 18, such as wavelength of photons, quantity of photons, period of pulses of photons, and/or pulse length of photons, and generate drive signals that control current, voltage, or other electrical properties to cause photon source 18 to emit photons having the various desired properties. While the example of FIG. 1 illustrates driver 20 receiving control signals from controller 36, in other examples, driver 20 may include a user interface configured to generate drive signals in response to a user input.

Pressure sensor 14 includes source electron multiplier 22. Source electron multiplier is configured to create a first plurality of electrons for ionizing gas molecules in ionization chamber 26. Source electron multiplier 22 is configured to receive a plurality of photons from photon source 18. For example, source electron multiplier 22 may be in a path of the plurality of photons, such that at least a portion of the plurality of photons may be incident on a surface of source electron multiplier 22. Source electron multiplier 22 is configured to generate a first plurality of electrons from the plurality of photons. For example, source electron multiplier 22 may be sensitive to energetic photons and may generate one or more electrons from the photon and amplify the one or more electrons into additional secondary electrons. Source electron multiplier 22 is configured to discharge the first plurality of electrons into ionization chamber 26 to generate a plurality of gas ions from at least a portion of the gas molecules.

By using photons to generate electrons for use in ionization chamber 26, pressure sensor 14 may more accurately control a quantity of the first plurality of electrons entering ionization chamber 26 than pressure sensing systems that do not utilize photons to generate electrons for ionization. For example, a pressure sensing system that utilizes gating techniques that control a quantity of charged particles entering an ionization chamber may have a slow cycling time and may be subject to wide variations in a quantity of electrons that enter the ionization chamber, which may result in a noisy pressure measurement signal that is slower to respond to changes in pressure. In contrast, photon source 18 and source electron multiplier 22 may operate to emit the plurality of photons, and correspondingly, the first plurality of electrons, in a controlled burst with a short period between bursts. As a result, the plurality of gas ions generated in ionization chamber 26 may more accurately and/or quickly reflect a pressure or change in pressure of environment 12.

Pressure sensor 14 includes ionization chamber 26. Ionization chamber 26 is configured to receive gas molecules from environment 12 at a pressure. For example, ionization chamber 26 may include one or more inlets configured to allow or control entry of a portion of the plurality of gas ions into a volume of ionization chamber 26, such as through an opening or microvalve in a wall of ionization chamber 26. Ionization chamber 26 is also configured to receive the first plurality of electrons (e.g., allow the first plurality of electrons to enter ionization chamber 26) from source electron multiplier 22 and provide an environment that allows the first plurality of electrons to ionize a portion of gas molecules. Ionization chamber 26 is configured to discharge the plurality of gas ions to (e.g., allow gas ions to contact) detection electron multiplier 28. In some examples, ionization chamber 26 may be bounded by source electron multiplier 22 and detection electron multiplier 28.

Pressure sensor 14 includes detection electron multiplier 28. Detection electron multiplier 28 is configured to generate a second plurality of electrons that represent a measurement of a quantity of the plurality of gas ions created by the first plurality of electrons. Detection electron multiplier 28 is configured to receive a plurality of gas ions from ionization chamber 26. For example, detection electron multiplier 28 may be in a path of the gas ions, such that at least a portion of the plurality of gas ions may be incident on a surface of detection electron multiplier 28. Detection electron multiplier 28 is configured to generate a second plurality of electrons from the plurality of gas ions that is proportional to a quantity of the plurality of gas ions. For example, detection electron multiplier 28 may be sensitive to charged particles, such as ions, and may generate one or more electrons in response to incidence of the plurality of gas ions and amplify the one or more electrons into additional secondary electrons. Detection electron multiplier 28 is configured to discharge the second plurality of electrons to electrode 32.

A variety of electron multipliers may be used for source electron multiplier 22 and/or detection electron multiplier 28 including, but not limited to, microchannel plates, discrete dynodes, continuous dynodes, and any other device capable of receiving a photon (source electron multiplier 22) or ion (detection electron multiplier 28) and generating electrons. In some examples, at least one of source electron multiplier 22 and detection electron multiplier 28 is a microchannel plate. A microchannel plate detector may include an input surface having an input electrode and an output surface having an output electrode. A plurality of microchannels may extend between the input surface and the output surface. The input electrode and output electrode may be configured to maintain a voltage potential across the input and output electrodes to accelerate electrons between the input and output surfaces to control an amplification of electrons emitted from the output surface. The plurality of microchannels may be configured to receive charged particles or energetic photons, such as photons as in source electron multiplier 22 or ions as in detection electron multiplier 28, and generate secondary electrons from collisions with walls of the plurality of microchannels. Each microchannel plate detector may have a high multiplication factor (e.g., between about $10^2$ and about $10^9$ electrons discharge/particle received) and a very short response time (e.g., less than about 1 millisecond between particle received and electrons discharged). Microchannel plate detectors may be relatively small, as electron generation characteristics may be based on a ratio of channel length to channel diameter and controlled by a potential difference across the input and output electrodes. In this way, source electron multiplier 22 and detection electron multiplier 28 may generate a highly variable and customizable quantity of electrons from received photons and ions, respectively, in a relatively small form factor.

Source electron multiplier 22 may be electrically coupled to a source power supply 24. Source power supply 24 may be configured to supply a voltage to source electron multiplier 22 to control a quantity of electrons generated by source electron multiplier 22. In some examples, controller 36 may be configured to adjust a gain of source electron multiplier 22 by controlling source power supply 24. A gain of source electron multiplier 22 may represent of a ratio of a quantity of the plurality of photons received by source electron multiplier 22 to a quantity of the first plurality of electrons discharged by source electron multiplier 22. For example, in implementations in which source electron multiplier 22 is a microchannel plate, source power supply 24 may supply voltages to the input electrode and the output electrode to create a voltage difference across the input and output electrodes. This voltage difference may be configured to produce the desired ratio of the quantity of the plurality of photons to the quantity of the first plurality of electrons. For example, at high pressures in which a concentration of gas molecules is relatively high, source power supply 24 may produce a relatively low voltage difference for a relatively low degree of multiplication, such that a quantity of the plurality of gas ions produced by the first plurality of electrons may stay within a range that is sufficiently high to limit noise at electrode 32 and sufficiently low to limit saturation at electrode 32. As another example, at low pressures in which the concentration of gas molecules is relatively low, source power supply 24 may produce a relatively high voltage difference for a relatively high degree of multiplication, such that the quantity of the plurality of gas ions produced may stay within the range. In some examples, source electron multiplier 22 and/or source power supply 24 may be configured to produce a gain between about 100 electrons per photon and about 100,000 electrons per photon.

Detection electron multiplier 28 may be electrically coupled to a detection power supply 30. Controller 36 may be configured to control detection power supply 30 to supply a voltage to detection electron multiplier 28 to control a quantity of electrons generated by detection electron multiplier 28. In some examples, detection power supply 30 may be configured to adjust a gain of detection electron multiplier 28. A gain of detection electron multiplier 28 may represent a ratio of a quantity of the plurality of gas ions received by detection electron multiplier 28 to the quantity of the second quantity of electrons generated by detection electron multiplier 28. For example, in examples in which detection electron multiplier 28 is a microchannel plate, detection power supply 30 may supply a voltage to the input electrode and the output electrode to create a voltage difference across the input and output electrodes. This voltage difference may be configured to produce the desired ratio of the quantity of the plurality of gas ions to the quantity of the second plurality of electrons. For example, at high pressures in which a quantity of the plurality of gas ions produced is relatively high, detection power supply 30 may produce a relatively low voltage difference for a relatively low degree of multiplication, such that a number of electrons produced may stay within a range that is sufficiently high to overcome noise and sufficiently low to avoid saturation at electrode 32. As another example, at low pressure in which the quantity of the plurality of gas ions produced is relatively low, detection power supply 30 may produce a relatively high voltage difference for a relatively high degree of multiplication, such that the number of electrons produced may stay within the range. In some examples, detection electron multiplier 28 and/or detection power supply 30 may be configured to produce a gain between about 100 electrons per photon and about 100,000 electrons per photon.

Pressure sensor 14 may include an electrode 32. Electrode 32 may be configured to receive the second quantity of electrons from detection electron multiplier 28. For example, electrode 32 may be in a path of the second plurality of electrons, such that at least a portion of the second plurality of electrons may be incident on a surface of electrode 32. Electrode 32 may be configured to generate an electrical signal from the second quantity of electrons that is proportional to the quantity of the second plurality of electrons incident on electrode 32. For example, the second plurality of electrons incident on electrode 32 may generate a current and/or voltage that represents the quantity of the plurality of gas ions generated by the first plurality of electrons, thus providing an indication of the pressure of environment 12. Electrode 32 may be configured to output the electrical signal. In some examples, electrode 32 is an anode.

Pressure sensing control system 16 may include a preamplifier 34. Preamplifier 34 may be configured to receive the electrical signal from electrode 32 and condition the electrical signal to produce a conditioned electrical signal. For example, preamplifier 34 may shape and amplify the electrical signal from electrode 32 so that the conditioned electrical signal may be used by controller 36 to generate the pressure measurement signal, such as by converting the electrical signal to a voltage level. In some examples, preamplifier 34 may be configured to select a gain and time constant based on a pressure of environment 12. For example, at low pressure, a number of counts of electrons intersecting electrode 32 may be low, such that preamplifier 34 may select a higher gain and time constant for sampling the pulses of the electrical signal from electrode 32. Preamplifier 34 may be configured to receive control signals from controller 36 and condition the electrical signal from electrode 32 based on the control signals. For example, preamplifier 34 may receive control signals from controller 36 that cause preamplifier to filter electrical signals outside an upper or lower discrimination level, capture an output pulse at a gain and time constant, and the like. Preamplifier 34 may be communicatively coupled to computing device 38 and configured to output the conditioned electrical signal to computing device 38.

Pressure sensing control system 16 may include controller 36. Controller 36 may be configured to generate control signals based on one or more input parameters from a parameter signal. The parameter signal may indicate one or more parameters of pressure sensing system 10 that may measure or control any of the plurality of photons, the first plurality of electrons, the plurality of gas ions, the second plurality of electrons or the electrical signal including, but not limited to: parameters related to photon source 18 and/or driver 20, such as wavelength of photons, quantity of photons, periodicity of pulses of photons, length of pulses of photons, and the like; parameters related to source and detection electron multipliers 22 and 28 and/or source and detection power supplies 24 and 30, such as input electrode voltage, output electrode voltage, a voltage difference between the input electrode voltage and the output electrode voltage for source and detection electron multipliers 22 and 28, and the like; parameters related to preamplifier 34; and the like. Controller 36 may be configured to receive the parameter signal from computing device 38 and generate control signals for any of driver 20, source power supply 24, detection power supply 30, and/or preamplifier 34 based on the parameter signal. In the example of FIG. 1, controller 36 is illustrated as receiving the parameter signal from computing device 38; however, in other examples, controller 36 may receive the parameter signal from other sources, such as an external computing device or a user input. Controller 36 may include a variety of processing components including, but not limited to, one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, controller 36 may be configured to send one or more parameter signals to computing device 38. For example, computing device 38 may use parameter values of the one or more parameters to determine a pressure measurement signal from the conditioned electrical signal.

Pressure sensing control system 16 may include computing device 38. Computing device 38 may be configured to receive the electrical signal from electrode 32, such as directly or as a conditioned electrical signal via preamplifier 34. Computing device 38 may be configured to determine a pressure based on the electrical signal from electrode 32 (or conditioned electrical signal from preamplifier 34) and one or more parameters related to components of pressure sensing system 10 and/or properties of environment 12. The one or more parameters may include, but are not limited to, a wavelength of photons, an intensity of the plurality of photons (e.g., which may represent a quantity of the plurality of photons), a gain of source electron multiplier 22 (e.g., which may represent a ratio of photons received to the first plurality of electrons generated), a gain of detection electron multiplier 28 (e.g., which may represent a ratio of the plurality of gas ions received to the second plurality of electrons generated), a gain of preamplifier 34 (e.g., which may represent any amplification or other shape change of the electrical signal from electrode 32), an ionization cross-section of the gas molecules, and other parameters related to properties, quantities, or a ratio of quantities of the plurality of photons, the first plurality of electrons, the plurality of gas ions, and the second plurality of electrons. Computing device 38 may be configured to output a pressure measurement signal representing the pressure of environment 12. Computing device 38 may include a variety of processing components including, but not limited to, one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components.

Pressure sensing system 10 may have a faster response time between receiving the plurality of photons from photon source 18 and outputting the electrical signal than pressure sensing systems that do not generate gas ions using photons and measure the plurality of gas ions using electrons. For example, a fast switching time of photon source 18, a fast residence time in source electron multiplier 22, ionization chamber 26, and detection electron multiplier 28, and a small gain and time constant of preamplifier 34 may result in pulses of photons from photon source 18 that may appear in the electrical signal in a short amount of time. In some examples, the response time is less than about 10 milliseconds.

Figure 4:
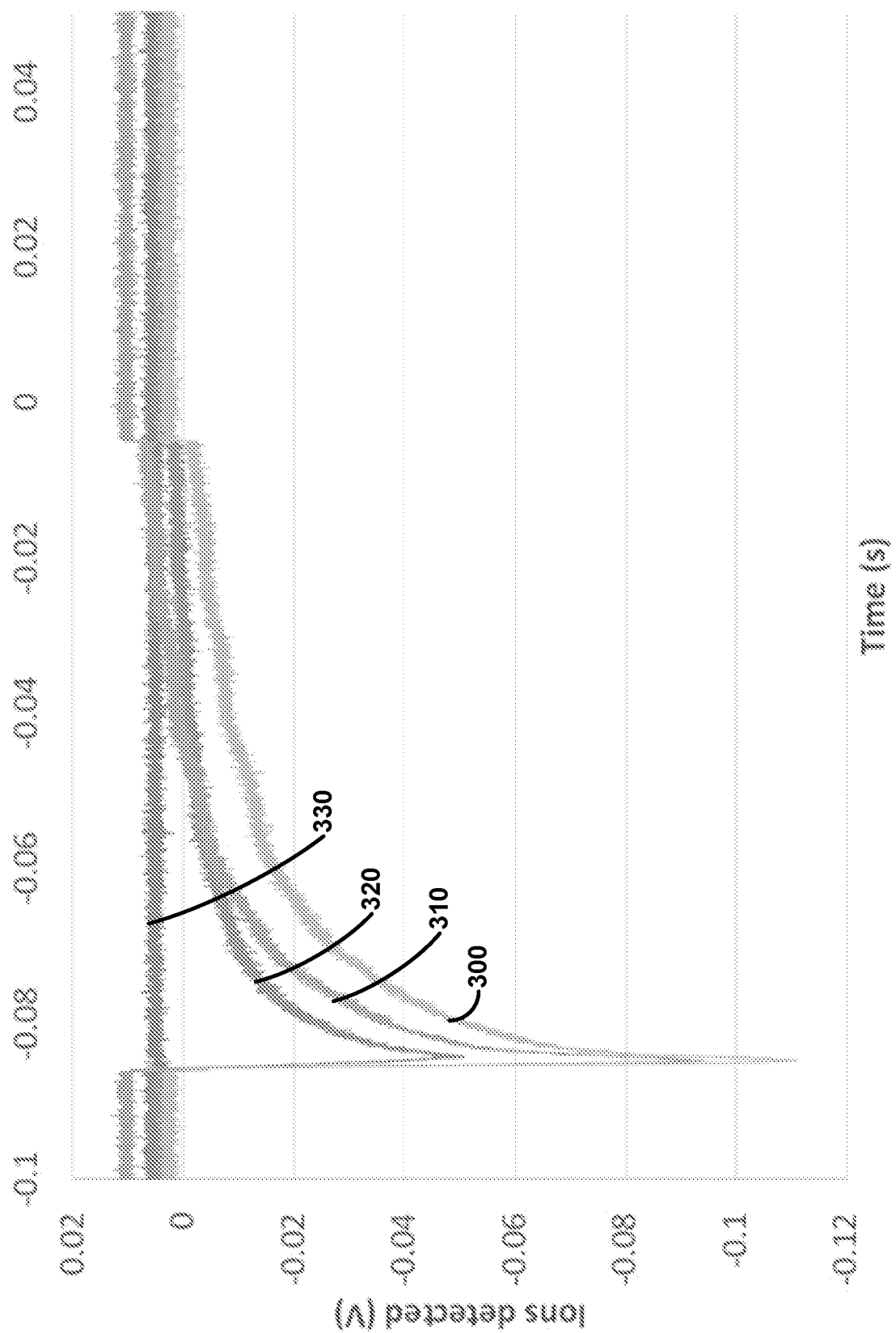
FIG. 4 is a graph illustrating response of an example pressure sensing system at various pressures, in accordance with examples described herein.

As an example, FIG. 4 is a graph illustrating response of an example pressure sensing system at various pressures created by opening an inlet valve for very short periods of time to produce very short gas pulses, in accordance with examples described herein. FIG. 4 includes a first response signal 300 having a response time for a gas pulse of 704 µs, a second response signal 310 having a response time for a gas pulse of 352 µs, a third response signal 320 having a response time for a gas pulse of 176 µs, and a background signal 330. As seen in FIG. 4, a change in a quantity of ions detected, as quantified by a voltage, may be detected and characterized with very short response times.

Pressure sensing system 10 may sense pressures with a wider range of pressures and/or a lower minimum pressure than pressure sensing systems that do not generate gas ions using photons and measure gas ions using electrons. For example, a controllable intensity of photon source 18, gain of source electron multiplier 22, gain of detection multiplier 28, and/or gain of preamplifier 34 may result in an electrical signal that may accurately represent a pressure of gas molecules of environment 12. In some examples, the pressure is between about $10^{-2}$ torr and about $10^{-9}$ torr.

Figure 2A:
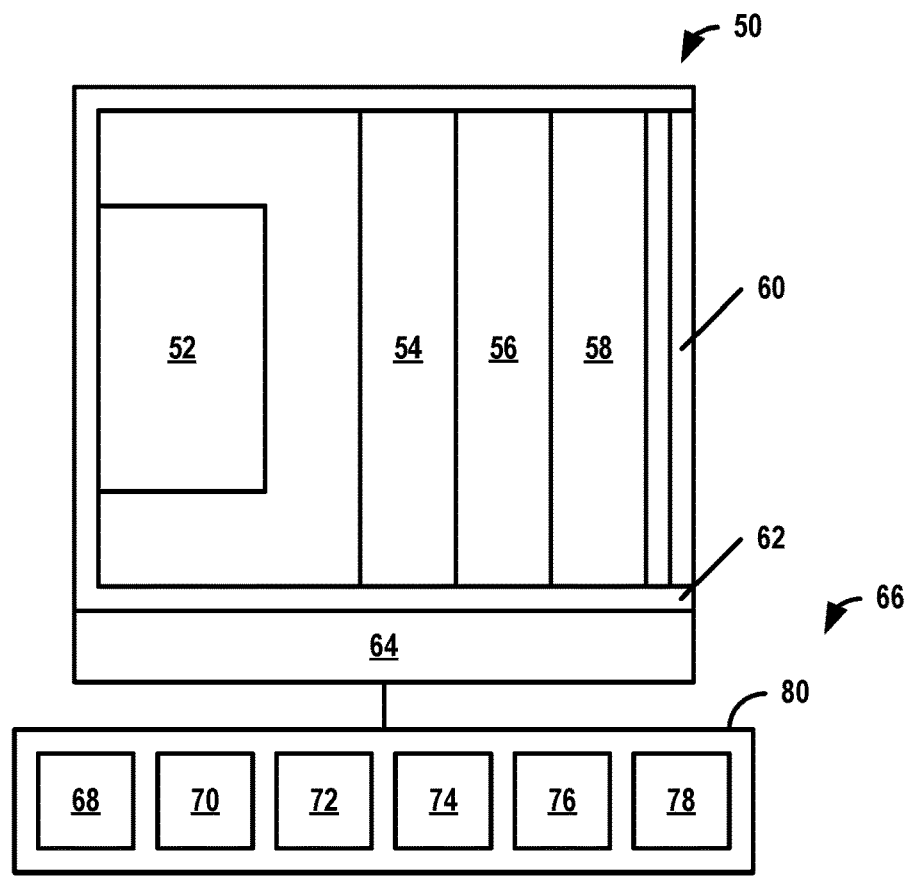
FIG. 2A is a conceptual side view diagram illustrating an example pressure sensing system, in accordance with examples discussed herein.
Figure 2B:
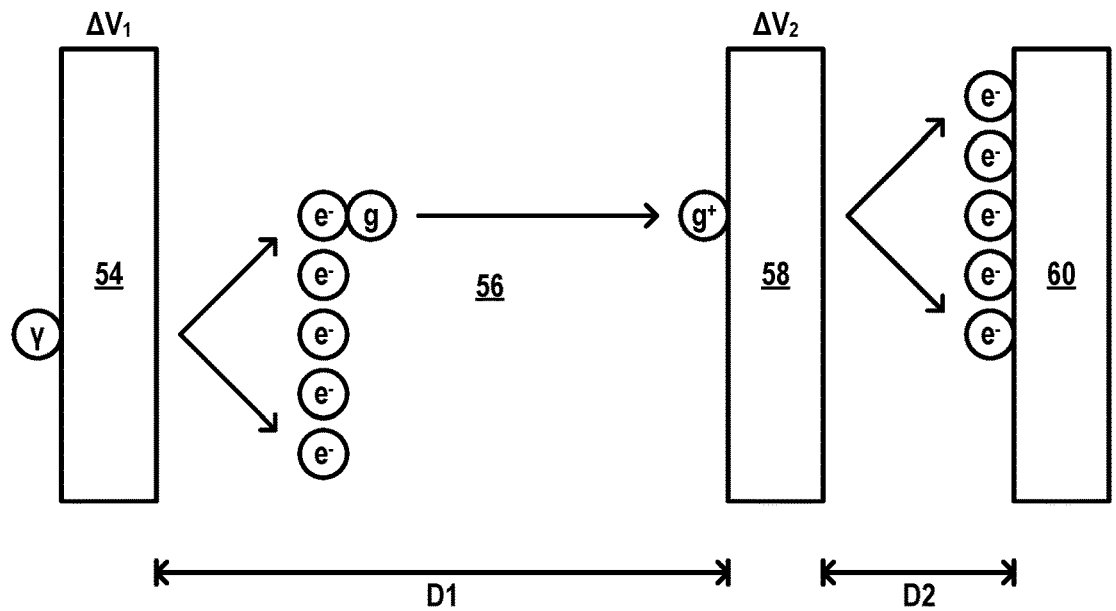
FIG. 2B is a conceptual side view diagram illustrating operation of an example pressure sensing system, in accordance with examples discussed herein.
Figure 2C:
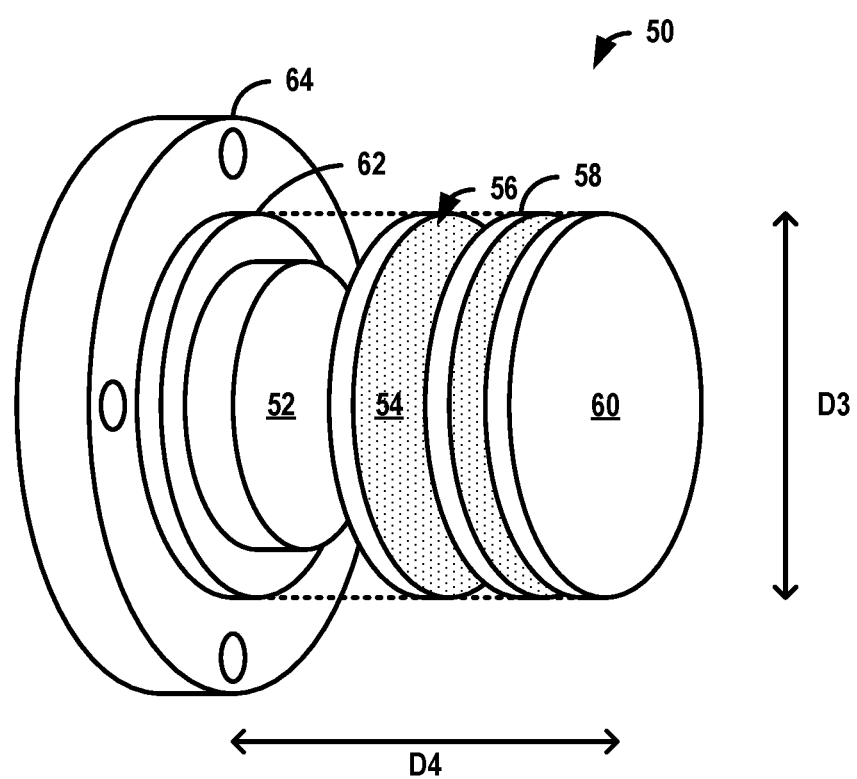
FIG. 2C is a perspective diagram of an example pressure sensor of a pressure sensing system, in accordance with examples described herein.

FIGS. 2A-2C illustrate an example pressure sensor 50 and pressure sensing control system 66, in accordance with examples discussed herein. Components of pressure sensor 50 and pressure sensing control system 66 may correspond to similarly operable components of pressure sensor 14 and pressure sensing control system 16 of pressure sensing system 10 of FIG. 1. For example, an LED 52, a source microchannel plate 54, an ionization chamber 56, a detection microchannel plate 58, an anode 60, a driver 68, a source power supply 70, a detection power supply 72, a preamplifier 74, a controller 76, and a computing device 78 may correspond to photon source 18, source electron multiplier 22, ionization chamber 26, detection electron multiplier 28, electrode 32, driver 20, source power supply 24, detection power supply 30, preamplifier 34, controller 36, and computing device 38, respectively.

FIG. 2A is a conceptual side view diagram illustrating an example pressure sensing system that includes pressure sensor 50 and pressure sensing control system 66, in accordance with examples discussed herein. As illustrated in FIG. 2A, LED 52, source microchannel plate 54, ionization chamber 56, detection microchannel plate 58, and anode 60 may be contained in a housing 62. Housing 62 may be configured to permit gas molecules to enter ionization chamber 56 and permit receipt and transmission of electrical signals from and to pressure sensing control system 66. Housing 62 may be coupled to a mount 64. Mount 64 may be configured to position pressure sensor 50 in a system, such that pressure sensor 50 may sufficiently sample an environment. As illustrated in FIG. 2A, driver 68, source power supply 70, detection power supply 72, preamplifier 74, controller 76, and computing device 78 may be contained in an electronics module 80 separate from pressure sensor 50. For example, electronics module 80 may be positioned outside (e.g., not in fluid communication with) the environment in which pressure sensor 50 is positioned. Housing 62, mount 64, and electronics module 80 may include feedthroughs for communicatively and/or electrically coupling components of pressure sensor 50 to components of pressure sensing control system 66.

FIG. 2B is a conceptual side view diagram illustrating operation of an example pressure sensing system, in accordance with examples discussed herein. The description of FIG. 2B is not intended to limit the mechanisms from which a pressure of an environment may be measured using the systems and techniques discussed herein, but merely to explain operation of an exemplary process.

Source microchannel plate 54 receives a pulse of a plurality of photons (γ) at an input electrode (illustrated as a single photon). The photon may have a wavelength related to energy of the photon, while the plurality of photons may have an intensity related to a quantity of the plurality of photons. The photon contacts a surface of a microchannel in source microchannel plate 54, which generates one or more electrons from the contact of the photon. A quantity of electrons generated for each photon may be related to the energy of the photon. The one or more electrons accelerate through source microchannel plate 54 based on a first voltage difference ($\Delta V_1$) across source microchannel plate 54 and create secondary electrons through collisions with surfaces of the channel. A number of electrons created through collisions may be related to a diameter of the microchannel (e.g., inversely proportional to diameter), the length of the microchannel (e.g., proportional to length), and the first voltage difference across microchannel plate 54 (e.g., proportional to first voltage difference).

The first plurality of electrons is discharged from source microchannel plate 54 into ionization chamber 56. Ionization chamber 56 includes gas molecules (g) from an environment at a concentration corresponding to a pressure of the environment. The likelihood that an electron from the first plurality of electrons impacts a gas molecule and ionizes the gas molecule is related to the concentration of the gas molecules, an ionization cross-section of the gas molecules, an effective ionizing pathlength of the first plurality of electrons, and an ion extraction efficiency of the gas molecules, such that as either of the concentration or the ionization cross-section of the gas molecules increases, a quantity of the plurality of gas ions for a particular quantity of the first plurality of electrons increases. The electrons ionize the gas molecule to create gas ions ($g^+$).

Detection microchannel plate 58 receives the plurality of gas ions (illustrated as a single gas ion). A quantity of the plurality of gas ions received by detection microchannel plate 58 may be related to a distance D1 between source microchannel plate 54 and detection microchannel plate 58. The gas ion contacts a surface of a microchannel in detection microchannel plate 58 and generates one or more electrons. A quantity of electrons generated for each gas ion received may be related to the charge of the gas ion. The one or more electrons accelerate through detection microchannel plate 58 based on a second voltage difference ($\Delta V_2$) across detection microchannel plate 58 and create secondary electrons through collisions with surfaces of the channel. A number of electrons created through collisions may be related to a diameter of the microchannel (e.g., inversely proportional to diameter), the length of the microchannel (e.g., proportional to length), and the second voltage difference across detection microchannel plate 58 (e.g., proportional to second voltage difference). The second plurality of electrons is discharged to anode 60.

Anode 60 receives the second plurality of electrons incident on a surface of anode 60. A quantity of the second plurality of electrons incident on the surface may indicate a quantity of the plurality of gas ions produced, and thus a concentration of gas molecules present, in ionization chamber 56. The quantity of the second plurality of electrons incident on the surface may be related to a distance D2 between detection microchannel plate 58 and anode 60. The second plurality of electrons incident on anode 60 may generate a current in anode 60. The current may include a pulse having a shape related to emission characteristics, such as pulse length, of the plurality of photons. The amplitude of the current may be proportional to a pressure of the environment, and may be influenced by any of the parameters discussed above.

FIG. 2C is a perspective diagram of an example pressure sensor 50 of a pressure sensing system, in accordance with examples described herein. In the example of FIG. 2C, housing 62 has a cylindrical form and is coupled to mount 64 that is a flange. Housing 62 may have a diameter D3 and a length D4. In some examples, diameter D3 and/or length D4 may each be less than about 5 centimeters, such as diameter D3 less than about 2 centimeters and/or length D4 less than about 3 centimeters. In some examples, pressure sensor 50 may be sized to fit into a tube less than about 2 centimeters in diameter. In some examples, pressure sensor 50 may be coupled to a flange that is less than 5 centimeters in diameter, such as a high vacuum flange. In some examples, pressure sensor 50 may have a volume less than about 200 mL, such as between about 50 mL and about 100 mL.

Figure 3:
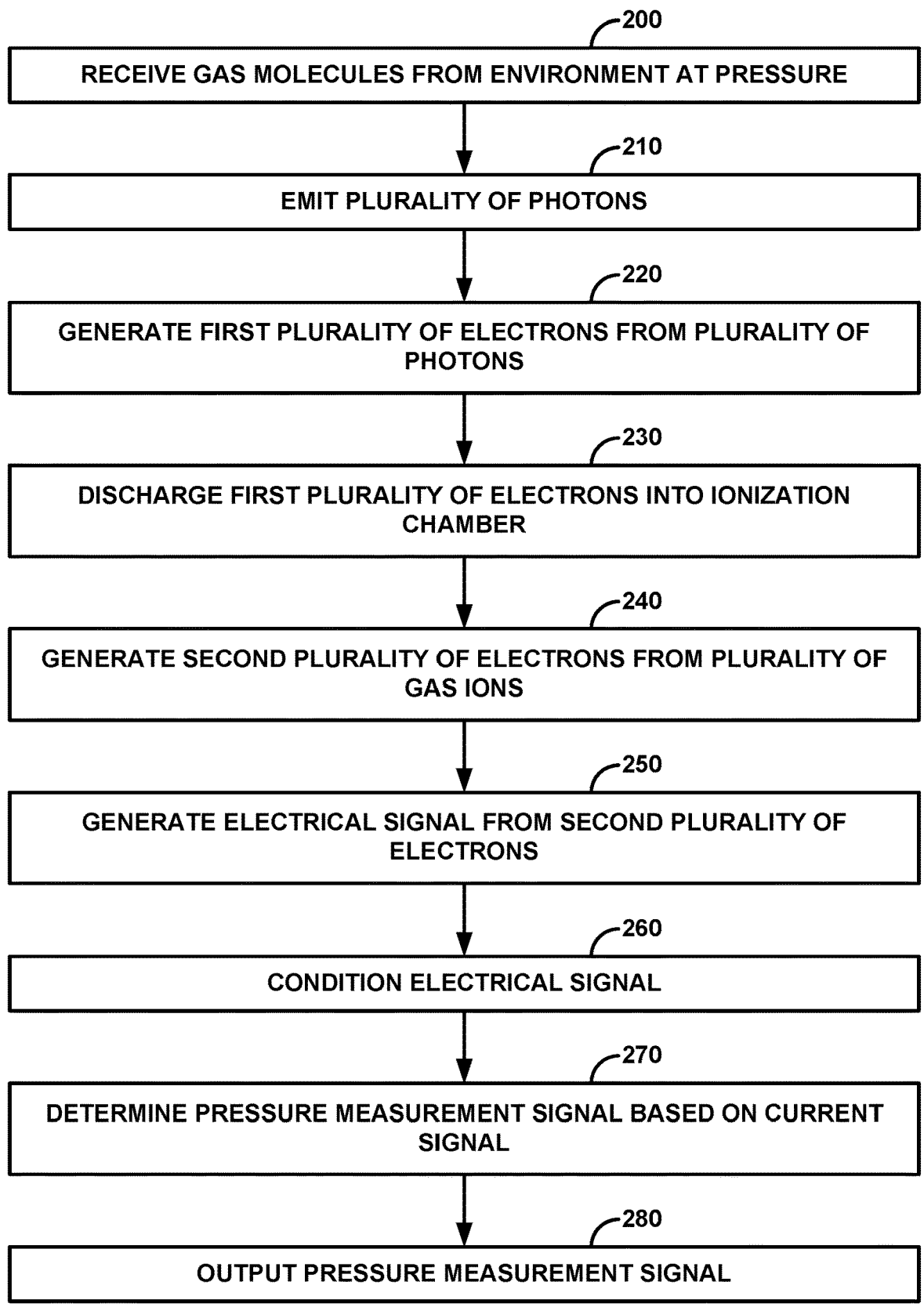
FIG. 3 is a flowchart of an example technique for outputting a pressure measurement signal of a pressure of an environment, in accordance with examples described herein.

FIG. 3 is a flowchart of an example technique for outputting a pressure measurement signal of a pressure of an environment, in accordance with examples described herein. The example technique of FIG. 3 will be described with reference to pressure sensing system 10 of FIG. 1; however, it will be understood that other systems may be used to implement the techniques of FIG. 3.

The method of FIG. 3 includes receiving, by ionization chamber 26, gas molecules from environment 12 at a pressure (200). For example, controller 36 may control an inlet (e.g., a microvalve) to ionization chamber 26. In some examples, the pressure of environment 12 is between about $10^{-2}$ torr and about $10^{-9}$ torr.

The method of FIG. 3 may include emitting, by photon source 18, a plurality of photons (210). In some examples, the plurality of photons includes ultraviolet (UV) photons. In some examples, photon source 18 emits the plurality of photons in pulses, such as pulses having a period less than about 1 millisecond.

The method of FIG. 3 includes generating, by a first electron multiplier (source electron multiplier 22), a first plurality of electrons from the plurality of photons from photon source 18 (220). In some examples, the method of FIG. 3 includes receiving, by source electron multiplier 22, electrical signals that adjust a gain of source electron multiplier 22. For example, the gain of source electron multiplier 22 may be representative of a ratio of a quantity of the plurality of photons to a quantity of the first plurality of electrons, such that source electron multiplier 22 may receive electrical signals, such as voltage, that are configured to adjust the gain of source electron multiplier 22. The method of FIG. 3 includes discharging, by source electron multiplier 22, the first plurality of electrons into ionization chamber 26 to generate a plurality of gas ions from at least a portion of the gas molecules from environment 12 (230).

The method of FIG. 3 includes generating, by a second electron multiplier (detection electron multiplier 28), a second plurality of electrons from the plurality of gas ions that is proportional to a quantity of the plurality of gas ions (240). A quantity of the second plurality of electrons may be representative of the pressure of environment 12. In some examples, the method of FIG. 3 includes receiving, by detection electron multiplier 28, electrical signals that adjust a gain of detection electron multiplier 28. For example, the gain of detection electron multiplier may be representative of a ratio of a quantity of the plurality of gas ions to the quantity of the second plurality of electrons.

The method of FIG. 3 may include generating, by electrode, a current from the second plurality of electrons (250). For example, electrode 32 may receive the electrons from detection electron multiplier 28, generate a current from the electrons that is proportional to the quantity of the second plurality of electrons, and output the current. In some examples, a response time between receiving the plurality of photons from photon source 18 and outputting the current is less than 10 milliseconds.

The method of FIG. 3 may include conditioning, by preamplifier 34, the current (260). The method of FIG. 3 may include determining, by computing device 38, a pressure measurement signal representing the pressure of environment 12 based on the current and an ionization cross-section of the gas molecules (270). For example, computing device 38 may receive the current from electrode 32, determine the pressure measurement signal based on the current of the electrical signal, various parameters of pressure sensor 14, and the ionization cross-section of the gas molecules, and output the pressure measurement signal representing the pressure of environment 12. The method of FIG. 3 may include outputting, by computing device 38, the pressure measurement signal (280). In some examples, computing device 38 may output the pressure measurement signal to an equipment protection system.

In some examples, the method of FIG. 3 may be used to determine a change in pressure based on a plurality of measurement signals. For example, the pressure may a first pressure at a first time, the plurality of photons may be a first plurality of photons, the plurality of gas ions may be a first plurality of gas ions, and the portion of the gas molecules may be a first portion of the gas molecules. The method of FIG. 3 may include receiving, by ionization chamber 26, gas molecules from environment 12 at a second pressure. The method of FIG. 3 may include generating, by source electron multiplier 22, a third plurality of electrons from the second plurality of photons from photon source 18 and discharging, by source electron multiplier 22, the third plurality of electrons into ionization chamber 26 to generate a second plurality of gas ions from at least a second portion of the gas molecules. The method of FIG. 3 may include generating, by detection electron multiplier 28, a fourth plurality of electrons from the second plurality of gas ions that is proportional to a quantity of the second plurality of gas ions, and in which a quantity of the fourth plurality of electrons is representative of the second pressure. The method of FIG. 3 may include determining, by computing device 38, a change in pressure based on the quantities of the second plurality of electrons and the fourth plurality of electrons.

Various examples have been described. These and other examples are within the scope of the following claims.

What is claimed is:

1. A system comprising:
   an ionization chamber configured to receive gas molecules from an environment at a pressure;
   a first electron multiplier configured to:
     receive a plurality of photons from a photon source;
     generate a first plurality of electrons from the plurality of photons; and
     discharge the first plurality of electrons into the ionization chamber to generate a plurality of gas ions from at least a portion of the gas molecules;
   a second electron multiplier configured to:
     receive the plurality of gas ions from the ionization chamber; and
     generate a second plurality of electrons from the plurality of gas ions that is proportional to a quantity of the plurality of gas ions, wherein a quantity of electrons of the second plurality of electrons is indicative of the pressure.

2. The system of claim 1, further comprising the photon source configured to emit the plurality of photons.

3. The system of claim 2,
   wherein the photon source comprises an ultraviolet (UV) light emitting diode (LED), and
   wherein the plurality of photons comprises UV photons.

4. The system of claim 2, wherein the photon source has a switching time of less than about 1 millisecond.

5. The system of claim 1, wherein at least one of the first and second electron multipliers is a microchannel plate.

6. The system of claim 1,
   wherein at least one of the first and second electron multipliers is configured to receive electrical signals that adjust a gain of the at least one of the first and second electron multipliers,
   wherein the gain of the first electron multiplier is representative of a ratio of a quantity of the plurality of photons to a quantity of the first plurality of electrons, and
   wherein the gain of the second electron multiplier is representative of a ratio of a quantity of the plurality of gas ions to the quantity of the second quantity of electrons.

7. The system of claim 1, further comprising an electrode configured to:
   receive the second quantity of electrons from the second electron multiplier;
   generate an electrical signal from the second quantity of electrons that is proportional to the quantity of the second quantity of electrons; and
   output the electrical signal.

8. The system of claim 7, further comprising a computing device configured to:
   receive the electrical signal from the electrode;
   determine the pressure based on the electrical signal and an ionization cross-section of the gas molecules; and
   output a pressure measurement signal representing the pressure.

9. The system of claim 7, wherein a response time between receiving the plurality of photons from the photon source and outputting the electrical signal is less than about 10 milliseconds.

10. The system of claim 1, wherein the pressure is between about $10^{-2}$ torr and about $10^{-9}$ torr.

11. The system of claim 1,
    wherein the pressure is a first pressure,
    wherein the plurality of photons is a first plurality of photons, wherein the plurality of gas ions is a first plurality of gas ions,
    wherein the portion of the gas molecules is a first portion of the gas molecules,
    wherein the ionization chamber is configured to receive gas molecules from the environment at a second pressure,
    wherein the first electron multiplier is configured to generate a third plurality of electrons from a second plurality of photons from a photon source,
    wherein the first electron multiplier is configured to discharge the third plurality of electrons into the ionization chamber to generate a second plurality of gas ions from at least a second portion of the gas molecules,
    wherein the second electron multiplier is configured to generate a fourth plurality of electrons from the second plurality of gas ions that is proportional to a quantity of the second plurality of gas ions, wherein a quantity of the fourth plurality of electrons is representative of the second pressure, and wherein the system further comprises a computing device is configured to determine a change in pressure based on the quantities of the second plurality of electrons and the fourth plurality of electrons.

12. A method, comprising:

receiving, by an ionization chamber, gas molecules from an environment at a pressure;

generating, by a first electron multiplier, a first plurality of electrons from a plurality of photons from a photon source;

discharging, by the first electron multiplier, the first plurality of electrons into the ionization chamber to generate a plurality of gas ions from at least a portion of the gas molecules;

generating, by a second electron multiplier, a second plurality of electrons from the plurality of gas ions that is proportional to a quantity of the plurality of gas ions, wherein a quantity of the second plurality of electrons is indicative of the pressure.

13. The method of claim 12, further comprising emitting, by the photon source, the plurality of photons.

14. The method of claim 13, wherein the photon source comprises an ultraviolet (UV) light emitting diode (LED), and wherein the plurality of photons comprises UV photons.

15. The method of claim 13, wherein the photon source has a switching time of less than about 1 millisecond.

16. The method of claim 12, wherein at least one of the first and second electron multipliers is a microchannel plate.

17. The method of claim 12, further comprising receiving, by at least one of the first and second electron multipliers, electrical signals that adjust a gain of the at least one of the first and second electron multipliers, wherein the gain of the first electron multiplier is representative a ratio of a quantity of the plurality of photons to a quantity of the first plurality of electrons, and wherein the gain of the second electron multiplier is representative of a ratio of a quantity of the plurality of gas ions to the quantity of the second plurality of electrons.

18. The method of claim 12, further comprising:

receiving, by an electrode, the second plurality of electrons from the second electron multiplier;

generating, by the electrode, an electrical signal from the electrons that is proportional to the quantity of the second plurality of electrons; and outputting, by the electrode, the electrical signal.

19. The method of claim 18, further comprising:

receiving, by a computing device, the electrical signal from the electrode;

determining, by the computing device, the pressure based on the electrical signal and an ionization cross-section of the gas molecules; and outputting, by the computing device, a pressure measurement signal representing the pressure.

20. The method of claim 18, wherein a response time between receiving the plurality of photons from the photon source and outputting the electrical signal is less than 10 milliseconds.

21. The method of claim 12, wherein the pressure is a first pressure, wherein the plurality of photons is a first plurality of photons, wherein the plurality of gas ions is a first plurality of gas ions, wherein the portion of the gas molecules is a first portion of the gas molecules, and wherein the method further comprises:

receiving, by the ionization chamber, gas molecules from an environment at a second pressure;

generating, by the first electron multiplier, a third plurality of electrons from a second plurality of photons from a photon source;

discharging, by the first electron multiplier, the third plurality of electrons into the ionization chamber to generate a second plurality of gas ions from at least a second portion of the gas molecules;

generating, by the second electron multiplier, a fourth plurality of electrons from the second plurality of gas ions that is proportional to a quantity of the second plurality of gas ions, wherein a quantity of the fourth plurality of electrons is representative of the second pressure; and determining, by a computing device, a change in pressure based on the quantities of the second plurality of electrons and the fourth plurality of electrons.

22. The method of claim 12, wherein the pressure is between about $10^{-2}$ torr and about $10^{-9}$ torr.

* * * * *